US012762091B2

(12) United States Patent
An et al.

(10) Patent No.: US 12,762,091 B2
(45) Date of Patent: Oct. 13, 2026

(54) METHODS AND SYSTEMS TO CONFIGURE A STABLE FILE SYSTEM

(71) Applicant: Hand Held Products, Inc., Charlotte, NC (US)

(72) Inventors: Peng An, Charlotte, NC (US); Youhua Zhu, Charlotte, NC (US); Lei Bian, Charlotte, NC (US); Weiqing Lu, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 19/252,672

(22) Filed: Jun. 27, 2025

(65) Prior Publication Data

US 2026/0017236 A1 Jan. 15, 2026

(30) Foreign Application Priority Data

Jul. 11, 2024 (CN) .......................... 202410931111.8

(51) Int. Cl.
*G06F 16/17* (2019.01)
*G06F 9/4401* (2018.01)

(52) U.S. Cl.
CPC .......... *G06F 16/173* (2019.01); *G06F 9/4401* (2013.01)

(58) Field of Classification Search
CPC .... G06F 16/173; G06F 9/4401; G06F 9/4411; G06F 9/44505
See application file for complete search history.

(56) References Cited

U.S. PATENT DOCUMENTS 10,204,011 B1 * 2/2019 Burriss ............... G06F 11/1438
10,496,307 B1 * 12/2019 Peros .................... G06F 3/0632
2014/0129820 A1 5/2014 Lim et al.
2016/0188430 A1 * 6/2016 Nitta .................. G06F 11/2094 714/6.3
2018/0143840 A1 * 5/2018 Fallon .................. G06F 9/4408
2018/0165101 A1 * 6/2018 Bulusu ................ G06F 11/1438
2018/0330094 A1 * 11/2018 Goeb .................... G06F 16/182
2025/0377899 A1 * 12/2025 Sayyed ................. G06F 9/4401

FOREIGN PATENT DOCUMENTS

CN 101751273 A 6/2010

OTHER PUBLICATIONS

Implement Virtual A/B | Android Open Source Project, [retrieved from Internet Dec. 10, 2025], <https://source.android.com/docs/core/ota/virtual_ab/implement> (7 pages).

* cited by examiner

*Primary Examiner* — William P Bartlett
(74) *Attorney, Agent, or Firm* — Alston & Bird LLP

(57) ABSTRACT

A method, comprising receiving, via a user interface, at least one input related to at least one file system configuration from a computing device; saving, via at least one processor, one or more flags corresponding to the at least one input into a factory reset protection module; initializing a booting phase of the computing device; reading the one or more flags from the factory reset protection module during the booting phase of the computing device; combining the one or more flags with a boot command line; transferring the combined one or more flags to a kernel module of the computing device; updating one or more default parameters defined in a file system table file using the kernel module; and creating the at least one file system configuration based at least on the file system table file using the kernel module.

20 Claims, 4 Drawing Sheets

METHODS AND SYSTEMS TO CONFIGURE A STABLE FILE SYSTEM

CROSS-REFERENCE TO RELATED APPLICATIONS

This application claims priority pursuant to 35 U.S.C. 119 (a) to Chinese Patent Application No. 202410931111.8, filed Jul. 11, 2024, which application is incorporated herein by reference in its entirety.

TECHNOLOGICAL FIELD

Example embodiments of the present disclosure relate generally to a file system in computing devices, and more particularly relates to methods and systems to configure a stable file system.

BACKGROUND

Various industrial products and consumer devices use operating system to perform one or more basic tasks. Such industrial products and consumer devices usually require rebooting when occurred with technical errors. Typically, the operating system uses a universal flash storage (UFS) hardware with a flash-friendly file system (F2FS) to attain a higher performance rate. Further, rebooting of such operating system involves a process of shutting down all running processes, closing active connections, and restarting the core components of the system, including kernel and essential system services. Sometimes user initiates rebooting of the operating system by removing a battery from the industrial products and consumer devices. Such rebooting actions interrupt the power supply and effectively force the operating system to shut down abruptly. Thereby, upon reinserting the battery and restarting the industrial products and consumer devices, the operating system undergoes the standard boot process. In such event, the operating system often encounters file corruption caused by a problematic reboot.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

The following presents a summary of some example embodiments to provide a basic understanding of some aspects of the present disclosure. This summary is not an extensive overview and is intended to neither identify key or critical elements nor delineate the scope of such elements. It will also be appreciated that the scope of the disclosure encompasses many potential embodiments in addition to those here summarized, some of which will be further described in the detailed description that is presented later.

In one example embodiment, a method is disclosed. The method comprises receiving, via a user interface, at least one input related to at least one file system configuration from a computing device. Further, the method comprises saving, via at least one processor, one or more flags corresponding to the at least one input into a factory reset protection module of the computing device. Further, the method comprised initializing, via the at least one processor a booting phase of the computing device. Further, the method comprises reading, via the at least one processor, the one or more flags from the factory reset protection module of the computing device during the booting phase of the computing device. Further, the method comprises combining, via the at least one processor, the one or more flags with a boot command line. Further, the method comprises transferring, via the at least one processor, the combined one or more flags with the boot command line to a kernel module of the computing device. Further, the method comprises updating, via the at least one processor, one or more default parameters defined in a file system table file based at least on the one or more flags using the kernel module. Thereafter, the method comprises creating, via the at least one processor, the at least one file system configuration based at least on the file system table file within the computing device using the kernel module.

In some embodiments, the at least one input corresponds to enabling a barrier parameter or disabling the barrier parameter. In some embodiments, upon enabling the barrier parameter, the at least one file system configuration enables slower and more stable file transfer within a memory of the computing device. In some embodiments, on disabling the barrier parameter, the at least one file system configuration enables faster file transfer within the memory of the computing device.

In some embodiments, the at least one processor is communicatively coupled to a bootloader. In some embodiments, the method comprises reading, via the at least one processor, the one or more flags saved within the factory reset protection module during the booting phase of the computing device using the bootloader. In some embodiments, the method comprises combining, via the at least one processor, the one or more flags with the boot command line and transfer the one or more flags to the kernel module using the bootloader.

In another example embodiment, a system is disclosed. The system comprising a memory having one or more computer readable instructions, and at least one processor communicatively coupled with the memory. Further, the at least one processor executing the one or more computer readable instructions stored in the memory is configured to receive at least one input related to at least one file system configuration from a computing device, via a user interface. Further, the at least one processor is configured to save one or more flags corresponding to the at least one input into a factory reset protection module of the computing device. Further, the at least one processor is configured to initialize a booting phase of the computing device. Further, the at least one processor is configured to read the one or more flags from the factory reset protection module of the computing device. Further, the at least one processor is configured to combine the one or more flags with a boot command line. Further, the at least one processor is configured to transfer the combined one or more flags with the boot command line to a kernel module of the computing device. Further, the at least one processor is configured to update one or more default parameters defined in a file system table file based at least on the one or more flags using the kernel module. Thereafter, the at least one processor is configured to create the at least one file system configuration based at least on the file system table file within the computing device using the kernel module.

In another example embodiment, a non-transitory machine-readable information storage medium is disclosed. The non-transitory machine-readable information storage medium comprising one or more instructions which when executed by at least one processor to perform operations comprising receiving at least one input related to at least one file system configuration from a computing device; saving one or more flags corresponding to the at least one input into a factory reset protection module of the computing device; initializing a booting phase of the computing device; reading the one or more flags from the factory reset protection module of the computing device during the booting phase of the computing device; combining the one or more flags with a boot command line; transferring the combined one or more flags with the boot command line to the kernel module of the computing device; updating one or more default parameters defined in a file system table file based at least on the one or more flags, using the kernel module; and creating the at least one file system configuration based at least on the file system table file within the computing device using the kernel module.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below.

BRIEF DESCRIPTION OF THE DRAWINGS

Figure 1:
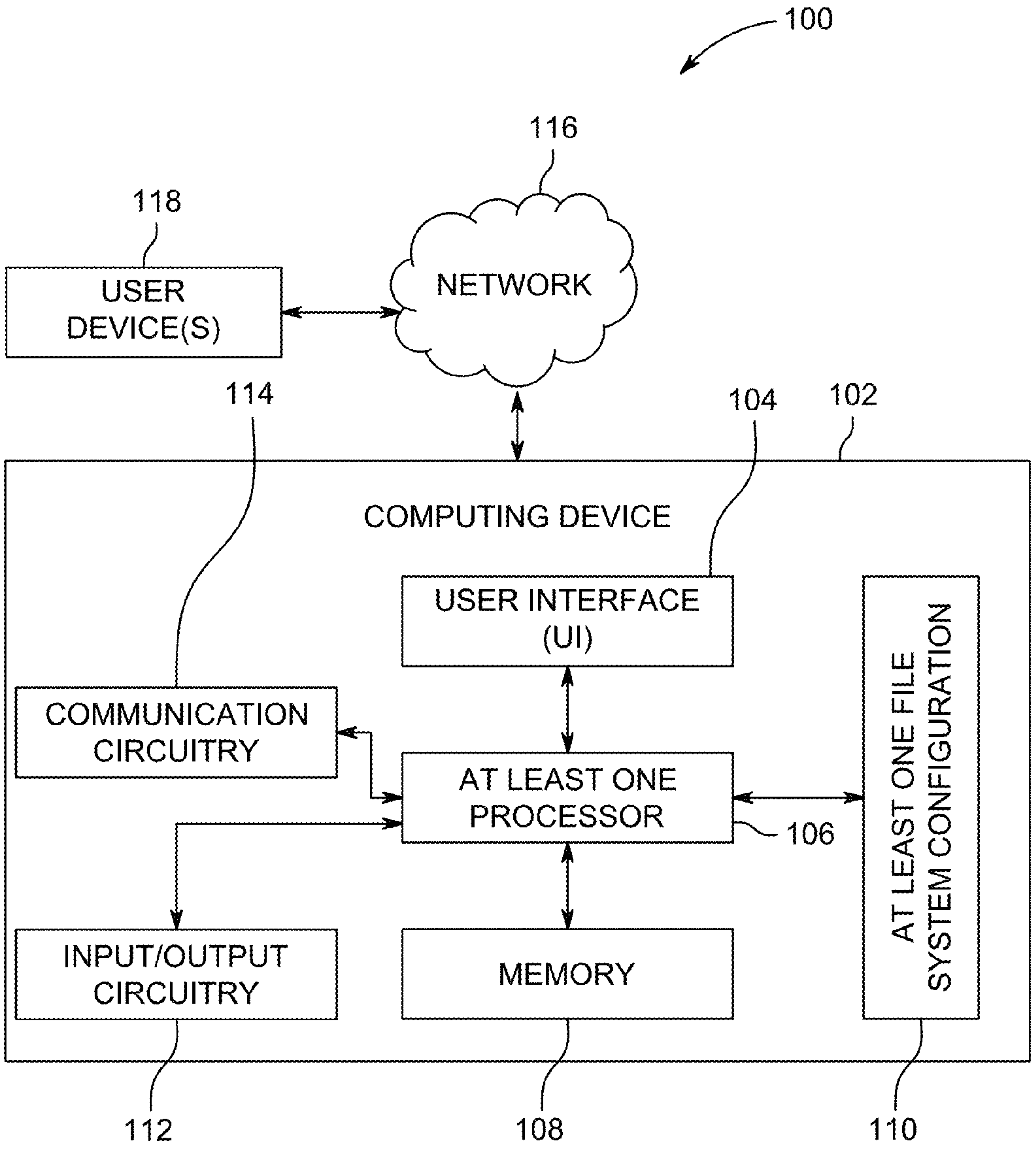
Figure 2:
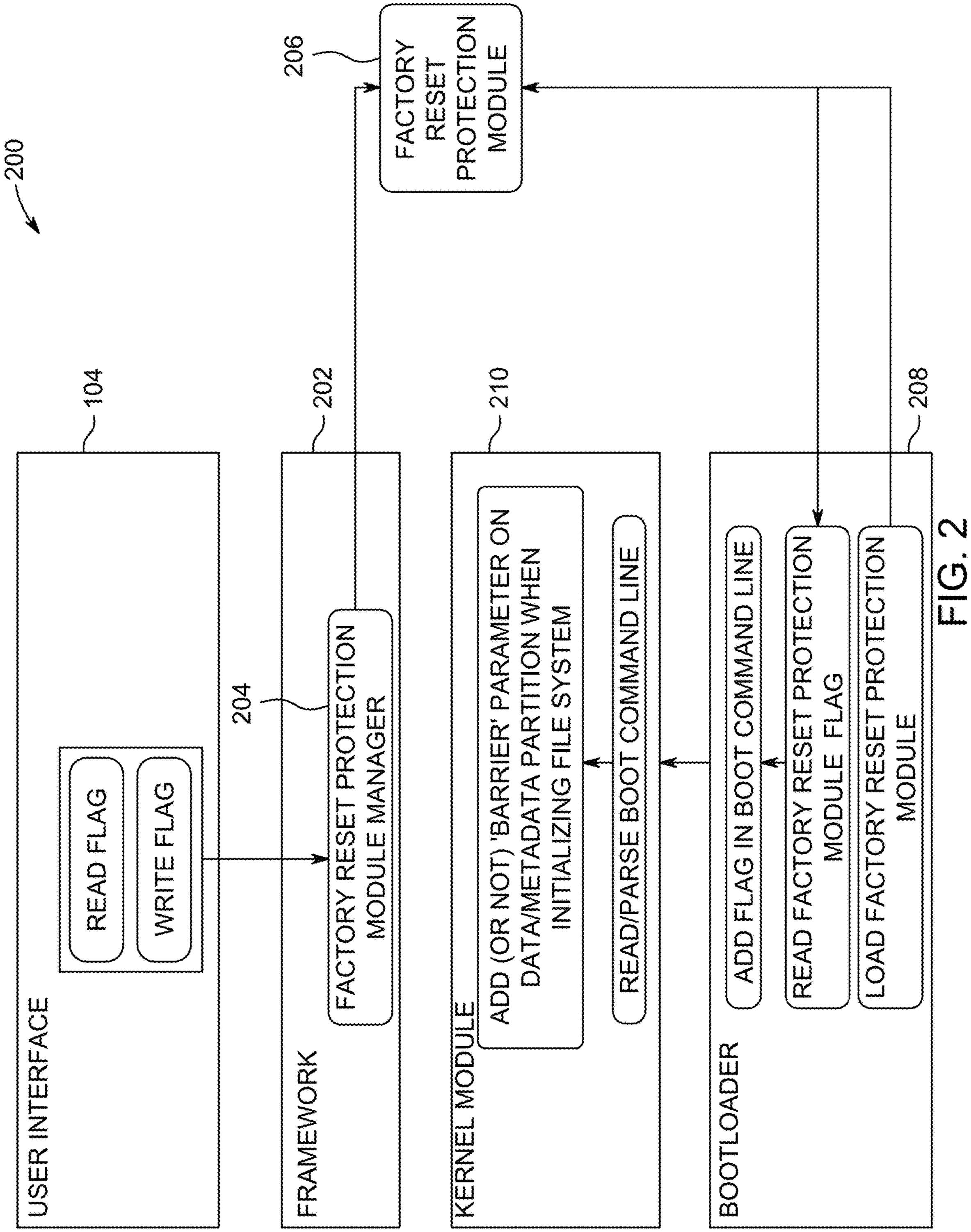
Figure 3:
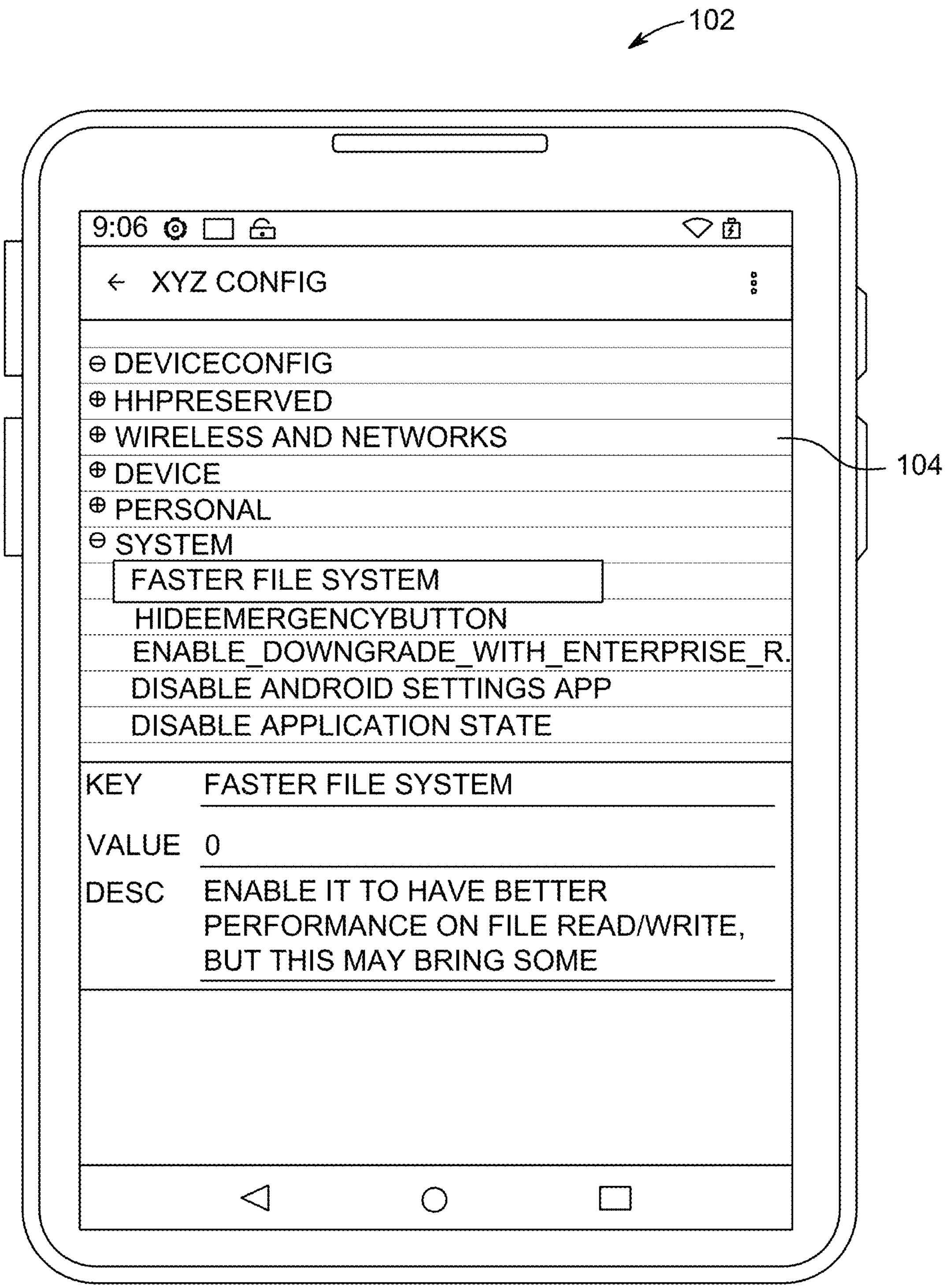
Figure 4:
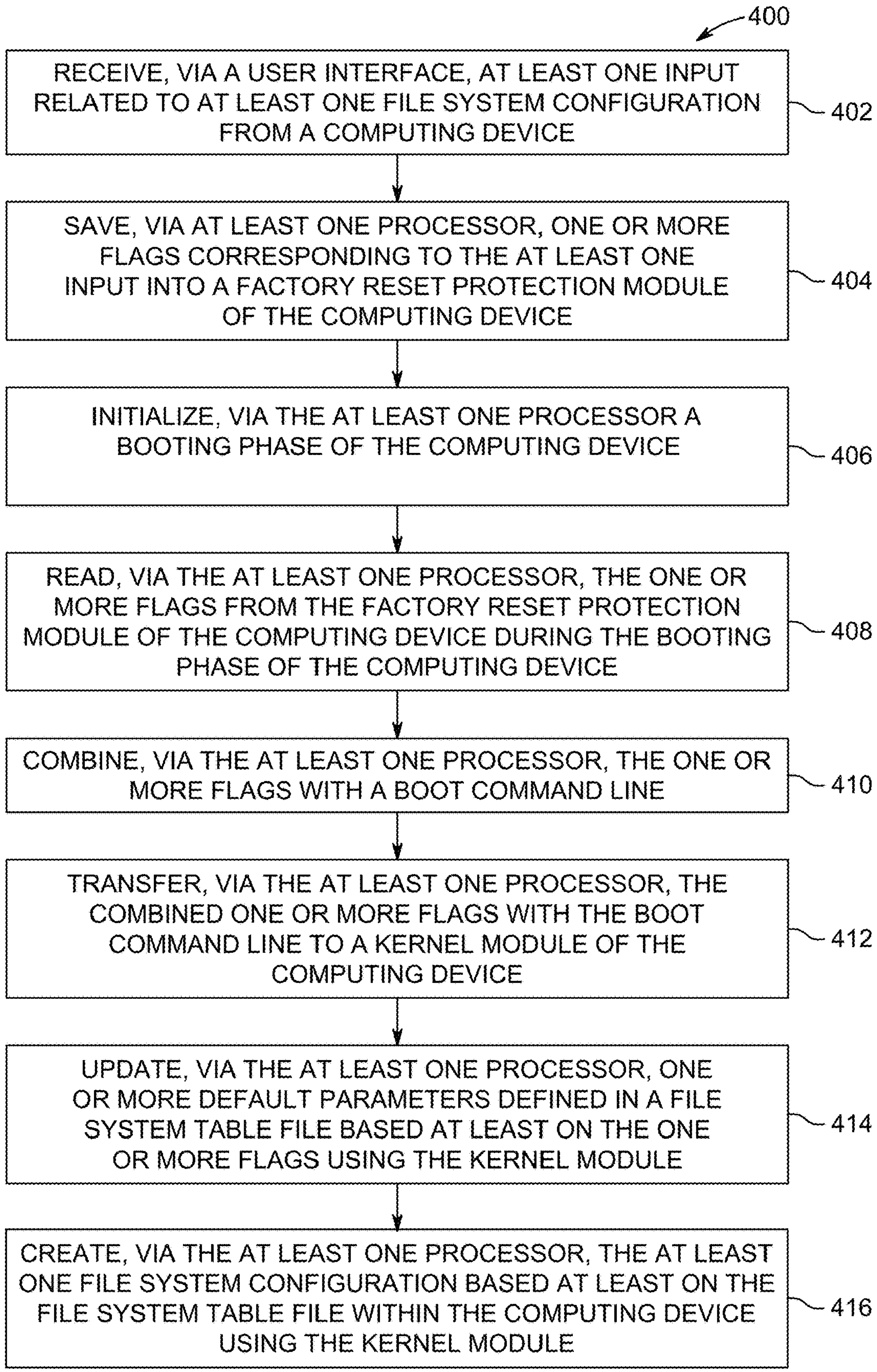

Having thus described certain example embodiments of the present disclosure in general terms, reference will hereinafter be made to the accompanying drawings, which are not necessarily drawn to scale, and wherein:

FIG. 1 illustrates a block diagram of a system to configure a stable file system in accordance with an example embodiment of the present disclosure;

FIG. 2 illustrates a block diagram showing a method to configure a stable file system in accordance with an example embodiment of the present disclosure;

FIG. 3 illustrates a configuration page of a user interface installed within a computing device in accordance with an example embodiment of the present disclosure; and, FIG. 4 illustrates a flowchart showing a method to configure a stable file system in accordance with an example embodiment of the present disclosure.

DETAILED DESCRIPTION

Some embodiments will now be described more fully hereinafter with reference to the accompanying drawings, in which some, but not all, embodiments of the present disclosure are shown. Indeed, various embodiments may be embodied in many different forms and should not be construed as limited to the embodiments set forth herein; rather, these embodiments are provided so that this disclosure will satisfy applicable legal requirements.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in various embodiments," "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The present disclosure provides various embodiments of a method and system to configure a stable file system. Embodiments may comprise a memory having one or more computer readable instructions. Embodiments may comprise at least one processor communicatively coupled with the memory. Embodiments may be configured to receive at least one input related to at least one file system configuration from a computing device via a user interface. Embodiments may save one or more flags corresponding to the at least one input into a factory reset protection module of the computing device. Embodiments may be configured to initialize a booting phase of the computing device. Embodiments may be configured read the one or more flags from the factory reset protection module of the computing device. Embodiments may be configured to combine the one or more flags with a boot command line. Embodiments may be configured to transfer the combined one or more flags with the boot command line to a kernel module of the computing device. Embodiments may be configured to update one or more default parameters defined in a file system table file based at least on the one or more flags, using the kernel module. Embodiments may be configured to create the at least one file system configuration based at least on the file system table file within the computing device using the kernel module.

FIG. 1 illustrates a block diagram of a system 100 to configure the stable file system, in accordance with an example embodiment of the present disclosure. The system 100 comprises a computing device 102. The computing device 102 may comprise a user interface 104, at least one processor 106 communicatively coupled with a memory 108, at least one file system configuration 110, an input/output circuitry 112, and a communication circuitry 114. Further, the system 100 may comprise a user device(s) 118 communicatively coupled to the computing device 102 via a network 116.

In some embodiments, the system 100 may correspond to a stable file system. In some embodiments, the system 100 may comprise the computing device 102. In some embodiments, the computing device 102 may include but not limited to a mobile phone, a tablet or like. In some embodiments, the computing device 102 may be accessed by a user to perform one or more operations. Further, the one or more operations may comprise at least one of providing a medium to input data/information, communicating with one or more other external devices, an image display, and providing various outputs.

In some embodiments, the computing device 102 further comprises the user interface 104. Further, the user interface 104 may be configured to enable the user to provide at least one input. In some embodiments, the at least one input may correspond to providing one or more parameters related to the at least one file system configuration 110 via the user interface 104. In some embodiments, the one or more parameters comprises a barrier parameter. Further, the barrier parameter may correspond to one or more permission sets associated with the memory 108 of the computing device 102. Further, the user interface 104 may correspond to at least one of a graphical user interface (GUI), a command-line interface (CLI), application programming interface (API). In at least one example, the user interface 104 may comprise a homepage, one or more redirection pages and one or more tabs linked with the homepage. In some embodiments, the user interface 104 may be operationally coupled with the at least one processor 106.

In some embodiments, the at least one processor 106 may include suitable logic, circuitry, and/or interfaces that are operable to execute one or more instructions stored in the memory 108 to perform predetermined operations. In one embodiment, the at least one processor 106 may be configured to decode and execute any instructions received from one or more other electronic devices or server(s). The at least one processor 106 may be configured to execute one or more computer-readable program instructions, such as program instructions to carry out any of the functions described in this description. Further, the at least one processor 106 may be implemented using one or more processor technologies known in the art. Examples of the at least one processor 106 include, but are not limited to, one or more general purpose processors and/or one or more special purpose processors.

In some embodiments, the at least one processor 106 may be configured to serve as a central processing unit (CPU) for the computing device 102. In some embodiments, the at least one processor 106 may be configured to execute instructions and managing computational tasks associated with the computing device 102. In some embodiments, the computing device 102 may further comprise an operating system. In some embodiments, the operating system may be installed within the computing device 102 and may be operated by the user. In some embodiments, the memory 108 may be configured to store one or more instruction sets associated with the operating system.

In some embodiments, the operating system and the memory 108 may be configured to execute the one or more instruction sets that may cause the at least one processor 106 to perform one or more operations. In some embodiments, the one or more operations may comprise at least one of data acquisition, data filtering, data processing, etc. In some embodiments, the operating system may comprise a plurality of modules. Further, the plurality of modules may comprise a framework, the factory reset protection module, a bootloader, and a kernel module.

In some embodiments, the at least one processor 106 may be configured to communicate with the operating system using a plurality of hardware interfaces and software protocols. Further, the plurality of hardware interfaces may comprise one or more buses and ports. Further, the plurality of hardware interfaces may be configured to enable transferring and exchanging of signals and data through/from the at least one processor 106. In some embodiments, the operating system may be configured to serve as a software platform. Further, the operating system may be configured to manage one or more resources associated with the computing device 102. In some embodiments, the operating system may be configured to provide the environment to run one or more applications on the computing device 102.

In some embodiments, the operating system may further comprise a system interface. In some embodiments, the system interface may be configured to display information associated with the one or more operations executed by the at least one processor 106. Further, the system interface may be configured to enable the user to add, update, delete or replace one or more system configurations. In some embodiments, the framework may be configured to enable the operating system to communicate with the memory 108 via the at least one processor 106. In some embodiments, the bootloader may be configured to initialize the operating system on the computing device 102. Further, the bootloader may correspond to a first software program that may be configured to execute, perform hardware initialization, and check integrity of the computing device 102.

In some embodiments, the operating system and the memory 108 may be configured to cause the at least one processor 106 to receive the at least one input provided by the user through the user interface 104. Further, the at least one input may relate to the at least one file system configuration 110. Further, the at least one processor 106 may be configured to save one or more flags into the factory reset protection module of the computing device 102. Further, the one or more flags may relate to the at least one input provided by the user through the user interface 104 of the computing device 102. Further, the one or more flags may correspond to a read flag, a write flag, a hold flag and a transfer flag.

In at least one example, the at least one input may correspond to enabling a barrier parameter. In various other example, the at least one input may correspond to disabling the barrier parameter. Further, the barrier parameter may comprise one or more permission sets related to the one or more flags. In some embodiments, the one or more permission sets may be configured to enable or block the functioning of the one or more flags. Further, upon enabling the barrier parameter, the at least one file system configuration 110 may enable a slower and more stable file transfer within the memory 108 of the computing device 102. Further, on disabling the barrier parameter, the at least one file system configuration 110 enables a faster file transfer within the memory 108 of the computing device 102.

In some embodiments, the computing device 102 may comprise the memory 108. Further, the memory 108 may be communicatively coupled to the at least one processor 106. In some embodiments, the memory 108 may be configured to store a set of instructions and data executed by the at least one processor 106. Further, the memory 108 may include the one or more instructions that are executable by the at least one processor 106 and the operating system to perform specific operations. It is apparent to a skilled artisan that the one or more instructions stored in the memory 108 enable the hardware of the computing device 102 to perform the predetermined operations. Some of the commonly known memory implementations include, but are not limited to, a random access memory (RAM) and a read-only memory (ROM). In some embodiments, the memory 108 may further comprise a data partition, a meta-data partition and the factory reset protection module.

In some embodiments, the at least one processor 106 may be configured to save the one or more flags corresponding to the at least one input into the factory reset protection module provided in the memory 108. In some embodiments, the at least one processor 106 may be configured to save the one or more flags into the factory reset protection module through the framework. In some embodiments, the framework may comprise a factory reset protection manager. In some embodiments, the factory reset protection manager may be configured to save the one or more flags into the factory reset protection module. Further, the factory reset protection manager may be configured to control and monitor a data management of the factory reset protection module.

In at least one example, upon successfully saving the one or more flags into the factory reset protection module, the at least one processor 106 may be configured to alert the user to manually reboot the computing device 102 by pressing and holding at least one power button provided with the computing device 102. Further, the at least one processor 106 may be configured to direct the user interface 104 to display at least one pop-up notification. Further, the at least one pop-up notification may be configured to direct the user to reboot the computing device 102 using the at least one power button. In some embodiments, the at least one processor 106 initialize a booting phase of the computing device 102 upon successful rebooting of the computing device 102.

In another example, upon successfully saving the one or more flags into the factory reset protection module, the at least one processor 106 may be configured to alert the user to reboot the computing device 102 by displaying at least one virtual button. Further, the at least one virtual button may be designed such that the operating system initiates rebooting of the computing device 102, upon pressing of the at least one virtual button over the user interface 104. Further, the at least one processor 106 may be configured to direct the user interface 104 to display at least one pop-up notification over the user interface 104. Further, the at least one pop-up notification may be configured to direct the user to reboot the system 100 using the at least one virtual button. In some embodiments, the at least one processor 106 initialize a booting phase of the computing device 102 upon successful rebooting of the computing device 102. Further, the booting phase may correspond to initialization of one or more resources associated with the computing device 102. In at least one example, the booting phase may correspond to a time period (i.e., 5-20 seconds).

In various other examples, upon successfully saving the one or more flags into the factory reset protection module, the operating system of the computing device 102 may cause the at least one processor 106 to initialize rebooting of the computing device 102. In some embodiments, the operating system may comprise one or more instructions that may cause the at least one processor 106 to reboot the computing device 102. Further, the one or more instructions may be stored within the memory 108. Further, the at least one processor 106 may be configured to direct the user interface 104 to display at least one pop-up notification. Further, the at least one pop-up notification may be configured to alert the user regarding initialization of the rebooting of the computing device 102. In some embodiments, the at least one processor 106 initialize a booting phase of the computing device 102 upon successful rebooting of the computing device 102.

In some embodiments, the at least one processor 106 may be configured to read the one or more flags from the factory reset protection module using the bootloader. Further, the bootloader may cause the at least one processor 106 to read the one or more flags from the factory reset protection module during the booting phase of the computing device 102.

In some embodiments, the at least one processor 106 may be configured to combine the one or more flags with a boot command line of the operating system. In some embodiments, the one or more flags may comprise the one or more read flags of the factory reset protection module. In some embodiments, the boot command line may correspond to an interface that may be configured to interact with the operating system. Further, the at least one processor 106 may be configured to transfer the combined one or more flags with the boot command line to the kernel module of the computing device 102. In some embodiments, the kernel module may be configured to manage one or more services associated with the operating system. Further, the one or more services may comprise at least one of a process management, memory management, device drivers, and security mechanisms. In some embodiments, the boot command line may be utilized for navigating the file system, manipulate files and directories inside the memory 108, install or uninstall applications and view system logs. Further, the at least one processor 106 may be configured to read the one or more flags from the boot command line of the operating system. Further, the at least one processor 106 utilized the kernel module of the operating system to read the one or more flags from the boot command line.

In some embodiments, the at least one processor 106 may be configured to update one or more default parameters defined in a file system table file based at least on the one or more flags. Further, the kernel module may be configured to cause the at least one processor 106 to update the one or more parameters defined in the file system table file of the operating system. In some embodiments, the file system table file may be configured to ensure configuration the at least one file system configuration 110 within the computing device 102. In at least one example, when the one or more default parameters may be updated by the at least one processor 106, the at least one file system configuration 110 enables slower and more stable file transfer within the memory 108 of the computing device 102. In another example, when the one or more default parameters remains unchanged, the at least one file system configuration 110 enables faster file transfer within the memory 108 of the computing device 102.

In some embodiments, the at least one processor 106 may be configured to create the at least one file system configuration 110, based at least on the file system table file within the computing device 102 using the kernel module. In some embodiments, when the barrier parameter may be enabled, the at least one processor 106 with the kernel module may be configured to update the one or more permission sets associated with the data partition and the metadata partition.

In some embodiments, the computing device 102 may further comprise the input/output circuitry 112. The input/output circuitry 112 may enable the user to communicate or interface with the user device(s) 118, via the computing device 102. The user device(s) 118 may include N number of user devices. In some embodiments, the input/output circuitry 112 may act as a medium to transmit input from the interface to and from the computing device 102. In some embodiments, the input/output circuitry 112 may refer to the hardware and software components that facilitate the exchange of information between the computing device 102 and the user device(s) 118. In at least one example, the computing device 102 may include the user interface 104 as input circuitry to allow the one or more users to input data. The input/output circuitry 112 may include various input devices such as keyboards, barcode scanners, GUI for the one or more users to provide data and various output devices such as displays, printers for the one or more users to receive data. In another example, the input/output circuitry 112 may include various output circuitry such as a display to show the alarm and/or the readings associated with the one or more media.

In some embodiments, the computing device 102 may further comprise the communication circuitry 114. The communication circuitry 114 may allow the at least one processor 106 to exchange data or information with other systems or apparatuses. Further, the communication circuitry 114 may include network interfaces, protocols, and software modules responsible for sending and receiving data or information. In some embodiments, the communication circuitry 114 may include Ethernet ports, Wi-Fi adapters, or communication protocols like HTTP or MQTT for connecting with other systems. The communication circuitry 114 may further include components such as communication modules (e.g., Wi-Fi, Ethernet, cellular), transceivers, antennas, and protocols (e.g., TCP/IP, MQTT, SNMP) for exchanging data with other systems or network devices. The communication circuitry 114 may allow the at least one processor 106 to stay up-to-date and accurately track the at least one normalized alerts.

In some embodiments, the input/output circuitry 112 and the communication circuitry 114 may be configured to integrate the at least one normalized alarm data with other systems such as Supervisory Control and Data Acquisition (SCADA), Building Management Systems (BMS), Enterprise Asset Management (EAM) systems, or third-party monitoring platforms for centralized monitoring, analysis, and control by operators and automated processes.

In some embodiments, the input/output circuitry 112 and the communication circuitry 114 may be configured to enable the computing device 102 to communicate with the user device(s) 118. In one example, the computing device 102 may be configured to be operated as a centralized server that may establish the network 116 with each of the user device(s) 118. Further, the at least one processor 106 may be configured to create the at least one file system configuration 110 into each of the user device(s) 118.

It will be apparent to one skilled in the art that the above-mentioned components of the system 100 have been provided only for illustration purposes, without departing from the scope of the disclosure.

FIG. 2 illustrates a block diagram 200 of a method to configure the stable file system, in accordance with an example embodiment of the present disclosure.

Firstly, the user interface 104 may be accessed by the user to provide the at least one input to the computing device 102. In some embodiments, the at least one input may be associated with the one or more flags of the memory 108. In some embodiments, the at least one input may correspond to enabling the barrier parameter or disabling the barrier parameter. Further, the one or more flags may relate to the at least one input provided by the user through the user interface 104 of the computing device 102. Further, the one or more flags may correspond to the read flag, the write flag, the hold flag and the transfer flag.

In some embodiments, the read flag may be configured to define operations of the at least one processor 106 related with accessing data within the memory 108. In some embodiments, the read flag may correspond to a set of permissions that may enable or block the at least one processor 106 to access the data within the memory 108. Further, the write flag may be configured to define operations of the at least one processor 10 related to inserting, updating, and deleting the data. Further, the hold flag may be configured to block access of the at least one processor 108 to the memory 108. Further, the transfer flag may be configured to define operations of the at least one processor 106 related with transferring of the data to other external resources of the computing device 102.

Successively, the at least one processor 106 may be configured to read the one or more flags associated with the at least one input provided by the user interface 104. Further, a framework 202 along with the memory 108 may cause the at least one processor 106 to read the one or more flags. In some embodiments, the framework 202 may employ a factory reset protection module manager 204 to read the one or more flags provided by the user interface 104. Further, the factory reset protection module manager 204 may be configured to control and monitor a data management of the memory 108.

Successively, the at least one processor 106 may be configured to save the one or more flags corresponding to the at least one input into the factory reset protection module 206. Further, the factory reset protection module 206 may be provided within the memory 108. In some embodiments, the at least one processor 106 may be configured to save the one or more flags into the factory reset protection partition through the framework 202. In some embodiments, the framework 202 may comprise the factory reset protection module manager 204. In some embodiments, the factory reset protection module manager 204 may be configured to save the one or more flags into the factory reset protection module 206.

Successively, the at least one processor 106 may be configured read the one or more flags from the factory reset protection module 206 of the memory 108. In some embodiments, the at least one processor 106 may be configured to read the one or more flags from the factory reset protection module 206 during the booting phase of the computing device 102. In some embodiments, the at least one processor 106 may employ a bootloader 208 to read the one or more flags from the factory reset protection module 206. Further, the booting phase may correspond to initialization of one or more resources associated with the system 100. Further, the booting phase may correspond to initialization of the one or more resources associated with the computing device 102. In at least one example, the booting phase may correspond to a time period (i.e., 5-20 seconds).

Successively, the at least one processor 106 may be configured to combine the one or more flags with the boot command line of the operating system. Further, the at least one processor 106 may utilize the bootloader 208 to combine the one or more flags with the boot command line. In some embodiments, the boot command line may correspond to an interface that may be configured to interact with the operating system. In some embodiments, the boot command line may be utilized for navigating the file system, manipulate files and directories inside the memory 108, install or uninstall applications and view system logs. In some embodiments, the boot command line may be utilized for navigating the at least one file system configuration 110, manipulate files and directories inside the memory 108, install or uninstall applications and view system logs. Further, the at least one processor 106 may be configured to read the one or more flags from the boot command line of the operating system. Further, the at least one processor 106 utilized a kernel module 210 of the operating system to read the one or more flags from the boot command line Successively, the at least one processor 106 may be configured to transfer the combined one or more flags with the boot command line to the kernel module 210. In at least one example, the at least one processor 106 may be configured to transfer the combined one or more flags with the boot command line to the kernel module 210 of the operating system. In various other examples, the at least one processor 106 may be configured to parse the combined one or more flags to the kernel module 210 of the operating system. In some embodiments, the kernel module 210 may be configured to manage one or more services associated with the operating system. Further, the one or more services may comprise at least one of a process management, memory management, device drivers, and security mechanisms.

Successively, the at least one processor 106 may be configured to update the one or more default parameters defined in the file system table file based at least on the one or more flags. In some embodiments, the at least one processor 106 may be configured to employ the kernel module 210 to update the one or more parameters into the default file system table file of the operating system, based at least on the at least one input provided through the user interface 104. In some embodiments, the default file system table file may be configured to ensure configuration of the faster file system or the stable file system. In at least one example, when the one or more parameters may be associated with the faster file system, the default file system table file remains unchanged. In various other examples, when the one or more parameters may be associated with the stable file system, the at least one processor 106 may be configured to update the default file system table file with the one or more parameters provided by the user through the user interface 104.

Successively, the at least one processor 106 may be configured to load the updated one or more default parameters into the factory reset protection module 206. Further, the operating system along with the memory 108 may cause the at least one processor 106 to update the one or more flags. Further, the updated one or more flags may be configured to update permissions of the at least one processor 106 related to accessing, editing, or transferring of the data.

FIG. 3 illustrates a configuration page of the user interface 104 installed within the computing device 102, in accordance with an example embodiment of the present disclosure.

In some embodiments, the user interface 104 may comprise the configuration page. Further, the configuration page may be configured to provide a software platform to the user to installed the at least one file system configuration 110 within the computing device 102. Further, the configuration page may comprise one or more lists. Further, the one or more lists may comprise at least one of a DEVICE CONFigure Further, the DEVICE CONFIG may comprise one or more sub-lists (HHP RESERVED, WIRELESS AND NETWORKS, DEVICE, DEVICE, PERSONAL, and SYSTEM). Further, the SYSTEM further comprises one or more virtual buttons. Further, the one or more virtual buttons may comprise at least one of a FASTER FILESYSTEM, HIDEEMERGENCYBUTTON, ENABLEDOWNGRADEWITHENTERPRISE_R, DISABLE ANDROID SETTINGS APP, DISABLE APPLICATION STATE. In some embodiments, the configuration page further comprises one or more input fields (KEY, VALUE, and DESC).

In some embodiments, the system 100 may comprise the computing device 102. Further, the computing device 102 may comprise at least one of a mobile phone, tablet, etc. Further, the computing device 102 may be configured to enable the user to perform one or more operations. Further, the one or more operations may include but not limited to communicating with other external systems or devices, performing computation-oriented tasks, providing audio-visual outputs. In one example, the computing device 102 may comprise a touch enabled display panel, one or more speakers, one or more microphones, antenna(s), etc. Further, the touch enabled display panel may be configured to provide a plurality of visual outputs. Further, the one or more speakers may be configured to provide audio outputs. Further, the one or more microphones may be configured to record audio inputs provided by the user.

In some embodiments, the computing device 102 may be installed with the user interface 104. Further, the user interface 104 may be configured to provide a software platform to communicate with the computing device 102 or other external devices using the computing device 102. In some embodiments, the user interface 104 may comprise one or more navigation bars, input fields, virtual buttons and various other interactive elements. In some embodiments, the user interface 104 may be accessed by the user to interact with the computing device 102. In some embodiments, the user interface 104 may be communicatively coupled with the at least one processor 106. Further, the user interface 104 may be configured to enable the user to provide the at least one input related to the at least one file system configuration 110 using the virtual buttons.

FIG. 4 illustrates a flowchart showing a method 400 to configure the stable file system, in accordance with an another example embodiment of the present disclosure.

At operation 402, the user interface 104 may be configured to receive the at least one input related to the at least one file system configuration 110 from the computing device 102. In some embodiments, the at least one input may correspond to the one or more parameters associated with the at least one file system configuration 110. Further, the at least one input corresponds to enabling the barrier parameter or disabling the barrier parameter. Further, based at least one the at least one input a rate of file transfer may be defined within the memory 108 of the computing device 102.

For example, a mobile phone is installed with the user interface 104. Further, the mobile phone comprises the memory 108 having the at least one file system configuration 110. Further, the user interface 104 is accessed by the user to provide at least one input related to the at least one file system configuration 110. The at least one input may correspond to one or more parameters associated with the at least one file system configuration 110. Further, the at least one input corresponds to enabling of the barrier parameter within the memory 108 of the mobile phone. Further, the at least one file system configuration 110 relates to a faster file transfer within the memory 108.

At operation 404, the at least one processor 106 may be configured to save the one or more flags corresponding to the at least one input into the factory reset protection module 206 of the computing device 102. Further, the factory reset protection module 206 may be provided within the memory 108. Further, the one or more flags may comprise the one or more read flags and the one or more write flags. In some embodiments, the at least one processor 106 may be configured to save the one or more flags into the factory reset protection partition through the framework 202. In some embodiments, the framework 202 may comprise the factory reset protection module manager 204. In some embodiments, the factory reset protection module manager 204 may be configured to save the one or more flags into the factory reset protection module 206.

For example, the mobile phone comprises the at least one processor 106 and the memory 108. Further, the at least one processor 106 is configured to save the at least one input into the factory reset protection module 206 within the memory 108. Further, the mobile phone comprises the framework 202 having the factory reset protection module manager 204. Further, the factory reset protection module manager 204 may be configured to save the one or more flags into the factory reset protection module 206 within the memory 108.

At operation 406, the at least one processor 106 may be configured to initialize the booting phase of the computing device 102. Further, the booting phase may correspond to initialization of the one or more resources associated with the computing device 102. Further, the booting phase may correspond to a time period (i.e., 5-20 seconds).

For example, the mobile phone comprises a display panel and a push button. Further, upon saving the one or more flags into the factory reset protection module 206 of the memory 108, the display panel is configured to display a notification to direct the user to reboot the mobile phone. Further, the push button is pressed by the user for a predefined period of time to initiate rebooting of the mobile phone. Further, the at least one processor 106 is configured to initiate a botting phase of the mobile phone.

At operation 408, the at least one processor 106 may be configured to read the one or more flags from the factory reset protection module 206 of the computing device 102 during the booting phase of the computing device 102. Further, the at least one processor 106 may be communicatively coupled with the bootloader 208. Further, the at least one processor 106 may be configured to read the one or more flags from the factory reset protection module 206 using the bootloader 208.

For example, the at least one processor 106 is configured to read the one or more flags from the factory reset protection module 206 of the memory 108 within the mobile phone during the booting phase. Further, the mobile phone comprises the bootloader 208. Further, the bootloader 208 may cause the at least one processor 106 to read the one or more flags from the factory reset protection module 206 during the booting phase.

At operation 410, the at least one processor 106 is configured to combine the one or more flags with a boot command line. Further, the bootloader 208 may cause the at least one processor 106 to combine the one or more flags with the boot command line. In some embodiments, the one or more flags may comprise the one or more read flags of the factory reset protection module 206. In some embodiments, the boot command line may correspond to the interface that may be configured to interact with an operating system of the computing device 102.

For example, the mobile phone comprises an operating system. Further, the at least one processor 106 is configured combine the one or more flags with a boot command line of the operating system. Further, the bootloader 208 is configured to cause the at least one processor 106 to combine the one or more flags with the boot command line.

At operation 412, the at least one processor 106 may be configured to transfer the combined one or more flags with the boot command line to the kernel module 210 of the computing device 102. Further, Further, the at least one processor 106 may be configured to transfer the combined one or more flags with the boot command line to the kernel module 210 of the computing device 102. In some embodiments, the kernel module 210 may be configured to manage the one or more services associated with the operating system. Further, the one or more services may comprise at least one of the process management, memory management, device drivers, and security mechanisms.

For example, the operating system of the mobile phone comprises a kernel module 210. Further, the at least one processor 106 of the mobile phone is configured to transfer the combined one or more flags with the boot command line to the kernel module 210 of the computing device 102.

At operation 414, the at least one processor 106 may be configured to update the one or more default parameters defined in the file system table file based at least on the one or more flags using the kernel module 210. In some embodiments, the at least one processor 106 may be configured to employ the kernel module 210 to update the one or more parameters into the default file system table file of the operating system. In some embodiments, the default file system table file may be configured to ensure configuration of the at least one file system configuration 110 with the slower and stable file transfer within the memory 108 or the faster file transfer within the memory 108.

For example, the at least one processor 106 is configured to update one of default parameters defined in a file system table file based at least one the one or more flags using the kernel module 210. Further, the updated one or more parameters corresponds to the barrier parameter. Further, based on the updated one or more parameters within the file system table file defines the at least one file system configuration 110 with the faster file transfer rate within the memory 108.

At operation 416, the at least one processor 106 may be configured to create the at least one file system configuration 110 based at least on the file system table file within the computing device 102 using the kernel module 210. In some embodiments, when the barrier parameter may be enabled, the at least one processor 106 with the kernel module 210 may be configured to update one or more permission sets associated with the data partition and the metadata partition of the memory 108.

For example, the at least one processor 106 is configured to create the at least one file system configuration 110 having the faster file transfer rate within the memory 108. Further, the kernel module 210 causes the at least one processor 106 to update one or more permission sets associated with a data partition and a metadata partition of the memory 108, based at least one the enabled barrier parameters.

In some embodiments, the system 100 may comprise at least one non-transitory machine-readable medium including data, which when used by at least one processor 106, causes the at least one processor 106 to perform instructions that cause the at least one processor 106 to perform operations comprising receiving at least one input related to at least one file system configuration 110 from a computing device 102. The at least one input may correspond to enabling a barrier parameter or disabling the barrier parameter. Upon enabling the barrier parameter, the at least one file system configuration 110 may enable slower and more stable file transfer within a memory 108 of the computing device 102. Upon disabling the barrier parameter, the at least one file system configuration 110 may enable faster and less-stable file transfer within the memory 108 of the computing device 102.

Further, the operations comprising saving one or more flags corresponding to the at least one input into the factory reset protection module 206 of the computing device 102. Further, the operations comprising initializing a booting phase of the computing device 102. Further, the operations comprising reading the one or more flags from the factory reset protection module 206 of the computing device 102. Further, the operations comprising combining the one or more flags with a boot command line. Further, the operations comprising transferring the combined one or more flags with the boot command line to the kernel module 210 of the computing device 102. Further, the operations comprising updating one or more default parameters defined in a file system table file based at least on the one or more flags, using the kernel module 210. Further, the operations comprising creating the at least one file system configuration 110 based at least on the file system table file within the computing device 102 using the kernel module 210.

Many modifications and other embodiments of the disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, via a user interface, at least one input related to at least one file system configuration from a computing device;

saving, via at least one processor, one or more flags corresponding to the at least one input into a factory reset protection module of the computing device;

initializing, via the at least one processor, a booting phase of the computing device;

reading, via the at least one processor, the one or more flags from the factory reset protection module of the computing device during the booting phase of the computing device;

combining, via the at least one processor, the one or more flags with a boot command line;

transferring, via the at least one processor, the combined one or more flags with the boot command line to a kernel module of the computing device;

updating, via the at least one processor, one or more default parameters defined in a file system table file based at least on the one or more flags using the kernel module; and, creating, via the at least one processor, the at least one file system configuration based at least on the file system table file within the computing device using the kernel module.

2. The method of claim 1, wherein the at least one input corresponds to enabling a barrier parameter or disabling the barrier parameter.

3. The method of claim 2, wherein upon enabling the barrier parameter, the at least one file system configuration enables slower and more stable file transfer within a memory of the computing device.

4. The method of claim 2, wherein on disabling the barrier parameter, the at least one file system configuration enables faster file transfer within a memory of the computing device.

5. The method of claim 1, wherein the at least one processor is communicatively coupled to a bootloader.

6. The method of claim 5 further comprising reading, via the at least one processor, the one or more flags saved within the factory reset protection module during the booting phase of the computing device using the bootloader.

7. The method of claim 5 further comprising combining, via the at least one processor, the one or more flags with the boot command line and transfer the one or more flags to the kernel module using the bootloader.

8. A system comprising:

a memory having one or more computer readable instructions; and, at least one processor communicatively coupled with the memory, wherein the at least one processor executing the one or more computer readable instructions stored in the memory is configured to:

receive at least one input related to at least one file system configuration from a computing device via a user interface;

save one or more flags corresponding to the at least one input into a factory reset protection module of the computing device;

initialize a booting phase of the computing device;

read the one or more flags from the factory reset protection module of the computing device;

combine the one or more flags with a boot command line;

transfer the combined one or more flags with the boot command line to a kernel module of the computing device;

update one or more default parameters defined in a file system table file based at least on the one or more flags using the kernel module; and, create the at least one file system configuration based at least on the file system table file within the computing device using the kernel module.

9. The system of claim 8, wherein the at least one input corresponds to enabling a barrier parameter or disabling the barrier parameter.

10. The system of claim 9, wherein upon enabling the barrier parameter, the at least one file system configuration enables slower and more stable file transfer within a memory of the computing device.

11. The system of claim 9, wherein on disabling the barrier parameter, the at least one file system configuration enables faster file transfer within the memory of the computing device.

12. The system of claim 8, wherein the at least one processor is communicatively coupled to a bootloader.

13. The system of claim 12, wherein the at least one processor is configured to read the one or more flags saved within the factory reset protection module during the booting phase of the computing device using the bootloader.

14. The system of claim 12, wherein the at least one processor is configured to combine the one or more flags with the boot command line and transfer the one or more flags to the kernel module using the bootloader.

15. A non-transitory machine-readable information storage medium comprising one or more instructions which when executed by at least one processor to perform operations comprising:

receiving at least one input related to at least one file system configuration from a computing device;

saving one or more flags corresponding to the at least one input into a factory reset protection module of the computing device;

initializing a booting phase of the computing device;

reading the one or more flags from the factory reset protection module of the computing device during the booting phase of the computing device;

combining the one or more flags with a boot command line;

transferring the combined one or more flags with the boot command line to a kernel module of the computing device;

updating one or more default parameters defined in a file system table file based at least on the one or more flags using the kernel module; and, creating the at least one file system configuration based at least on the file system table file within the computing device using the kernel module.

16. The non-transitory machine-readable information storage medium of claim 15, wherein the at least one input corresponds to enabling a barrier parameter or disabling the barrier parameter.

17. The non-transitory machine-readable information storage medium of claim 16, wherein upon enabling the barrier parameter, the at least one file system configuration enables slower and more stable file transfer within a memory of the computing device.

18. The non-transitory machine-readable information storage medium of claim 16, wherein on disabling the barrier parameter, the at least one file system configuration enables faster file transfer within a memory of the computing device.

19. The non-transitory machine-readable information storage medium of claim 15, wherein the at least one processor is communicatively coupled to a bootloader, wherein the at least one processor is configured to read the one or more flags saved within the factory reset protection module during the booting phase of the computing device using the bootloader.

20. The non-transitory machine-readable information storage medium of claim 19, wherein the at least one processor is configured to combine the one or more flags with the boot command line and transfer the one or more flags to the kernel module using the bootloader.

* * * * *